(12) United States Patent
Toncelli

(10) Patent No.: US 7,223,055 B2
(45) Date of Patent: May 29, 2007

(54) STRUCTURE FOR SUPPORTING THE SPINDLE IN A MACHINE TOOL AND METHOD FOR THE MANUFACTURE THEREOF

(76) Inventor: Luca Toncelli, Viale Asiago 34, 36061 Bassano del Grappa (Vicenza) (IT)

( * ) Notice: Subject to any disclaimer, the term of this patent is extended or adjusted under 35 U.S.C. 154(b) by 661 days.

(21) Appl. No.: 10/727,933

(22) Filed: Dec. 4, 2003

(65) Prior Publication Data

US 2004/0131420 A1    Jul. 8, 2004

Related U.S. Application Data

(63) Continuation of application No. PCT/EP03/03975, filed on Apr. 16, 2003.

(51) Int. Cl.
*B23C 9/00*    (2006.01)
*B23Q 1/00*    (2006.01)
*B23Q 1/70*    (2006.01)

(52) U.S. Cl. ................. 409/235; 409/231; 409/141; 408/234; 408/143; 408/239 R; 248/637

(58) Field of Classification Search .............. 409/235, 409/238, 231–233, 141; 408/234, 238, 239 R, 408/143; 82/149; 451/340, 361; 248/637–638
See application file for complete search history.

(56) References Cited

U.S. PATENT DOCUMENTS

| | | | |
|---|---|---|---|
| 4,382,820 A * | 5/1983 | Inoue | 106/644 |
| 4,657,455 A * | 4/1987 | Rogers et al. | 409/235 |
| 4,670,208 A | 6/1987 | Koblischek et al. | |
| 4,691,488 A * | 9/1987 | Tomma | 248/559 |
| 4,784,894 A | 11/1988 | Johnstone et al. | |
| 5,018,915 A * | 5/1991 | Inokuma et al. | 409/231 |
| 5,264,168 A | 11/1993 | Toncelli | |
| 5,317,837 A | 6/1994 | Stähli | |

(Continued)

FOREIGN PATENT DOCUMENTS

CH        638 880        10/1983

(Continued)

OTHER PUBLICATIONS

International Search Report dated Aug. 27, 2003.

(Continued)

*Primary Examiner*—Erica Cadugan
(74) *Attorney, Agent, or Firm*—Katten Muchin Rosenman LLP

(57) ABSTRACT

A support structure or sleeve for the spindle of a machine tool consists of a tubular casing, preferably made of sheet steel with a high modulus of elasticity, in contact with a layer of agglomerate obtained by casting inside the casing a mixture formed by a granulate of stone and/or ceramic and/or expanded clay material as well as a synthetic resin of the hardening type, which is subject to cross-linking. The structure thus obtained combines a high vibration damping factor with an excellent mechanical strength and a reduced weight. The structure may also comprise a second casing which is located inside the layer of agglomerate and in contact therewith. The mass of agglomerate may also have, embedded in it, pipes for circulation of a cooling fluid in order to dispose of the heat produced by the spindle during operation.

12 Claims, 1 Drawing Sheet

U.S. PATENT DOCUMENTS 5,415,610 A * 5/1995 Schutz et al. ................ 409/235
5,765,818 A * 6/1998 Sabatino et al. ............. 248/559
5,799,924 A * 9/1998 Slocum et al. .............. 248/636

FOREIGN PATENT DOCUMENTS

| EP | 0 052 166 | 5/1982 |
| GB | 1556941 A * | 12/1979 |
| JP | 0 054276 | 6/1982 |
| JP | 57-149884 | 9/1982 |

OTHER PUBLICATIONS

Dr-Ing. Rudolf-Georg Nicklau, Massing, Use of Resin-Containing Cement Conglomerate in the Construction of Machine Tools, pp. 537-542, 1987.

* cited by examiner

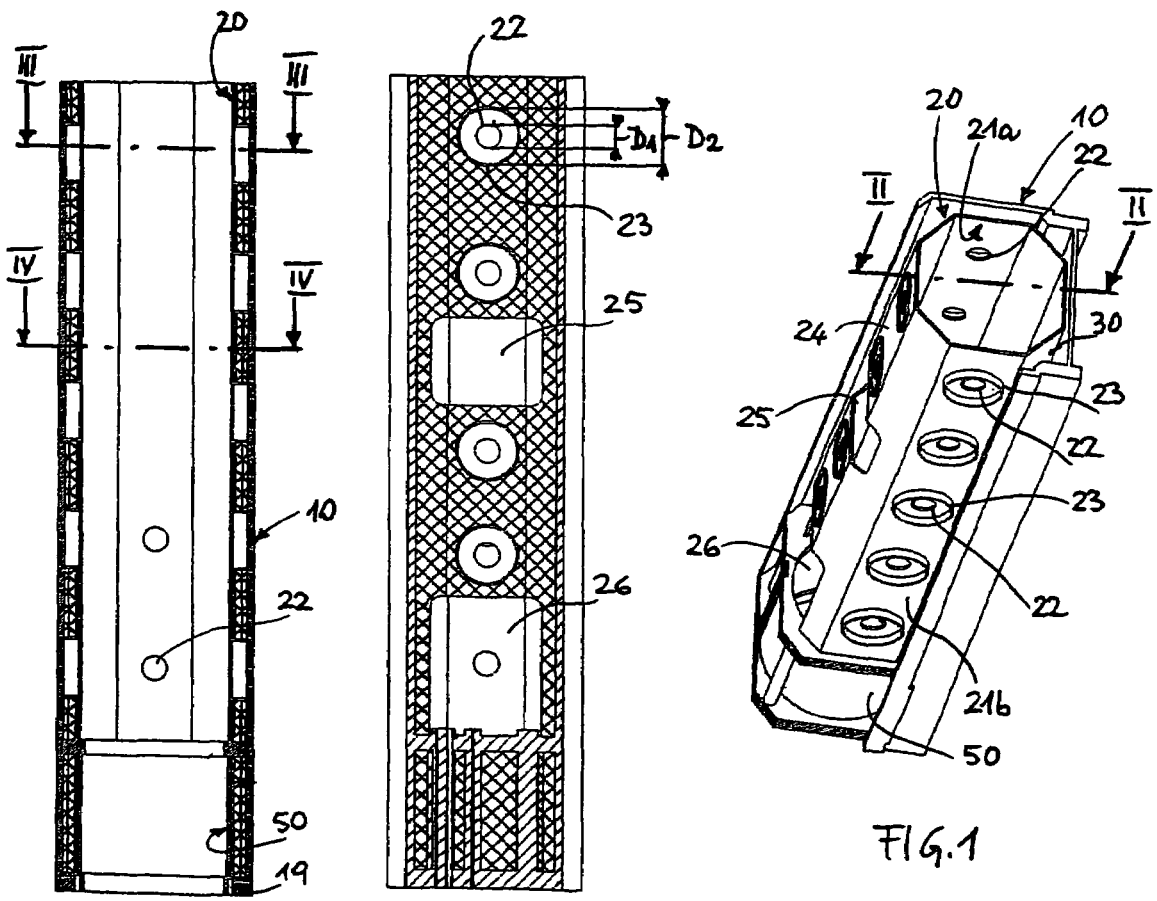

STRUCTURE FOR SUPPORTING THE SPINDLE IN A MACHINE TOOL AND METHOD FOR THE MANUFACTURE THEREOF

CROSS-REFERENCE TO RELATED APPLICATIONS

This is a continuation of International Application PCT/EP03/03975 filed Apr. 16, 2003.

FIELD OF THE INVENTION

The present invention relates to a structure, used for supporting the spindle in machine tools—in particular in numerical control machines—which is usually referred to by the name of "sleeve".

BACKGROUND OF THE INVENTION

The sleeve, which is normally mounted on a carriage, usually performs linear movements along three co-ordinate axes and has the machining tool mounted on its end. Depending on the configuration of the numerical control machine, the sleeve may be vertical or horizontal.

In the first configuration, which is characteristic of so-called gantry machines, the machine comprises a base or bench having two vertical walls or shoulders which support a cross-beam which has, running along it, a support structure, called a carriage, to which the sleeve is integrally joined and movable vertically. In the second type of machine, a vertical upright, which is slidable or fixed onto the base, extends upwards from the base or bench. The spindle-support carriage is mounted on the aforementioned upright, with the possibility of sliding in the vertical direction, while the sleeve, which is arranged horizontally and associated with the carriage, is movable horizontally.

The sleeve is per se a substantially tubular structure which is usually made of welded steel and inside which the main component of the machine tool, or the so-called spindle, is seated. There are two types of spindles: the first type, called an electric spindle, is positioned at the free end of the sleeve and has an attachment for the machining tool; the second type, called a motorised spindle, is housed inside the sleeve itself. For the sake of simplicity, in the present invention, the term "spindle" will be solely used since the sleeve which forms the invention may be used for supporting both an electric spindle and a motorised spindle.

A machine tool is subject to considerable stresses which may cause the deformation of some components, in particular the sleeve, which deformation adversely affects the precision required during machining, such as for example the machining of moulds, in which the tolerances of the finished product must be very small. If we consider the sleeve in particular, it must satisfy varying requirements which also are of a mutually opposing nature and can be summarised principally as follows:

a) rigidity, which by counteracting the abovementioned deformations, ensures that the requirements for precision during machining are satisfied;

b) damping of the vibrations resulting from machining, said vibrations also adversely affecting the machining precision and the possibility of achieving the desired tolerances; and c) dissipation of the heat which is produced by the spindle during operation of the machine tool and is due both to the friction (for example of the bearings and the sliding guides) and to the various functional electric components (such as the motors, for example) as a result of the Joule effect.

In order to satisfy the requirement for rigidity, the sleeve is usually made of welded steel or cast iron with a considerable thickness, which however also results in a notable weight. The latter affects the remaining structural part of the machine which must be especially strengthened. Apart from this (which in any case constitutes a drawback affecting the design and manufacture of the machine), there is an increase in the masses involved and therefore the sleeve movement times, unless sleeve actuating motors are used which are more powerful—and therefore ultimately more costly.

The use of steel for construction of the sleeves in any case does not ensure a good level of damping of the vibrations, while the use of nodular cast iron, which is able to dampen vibrations, has the drawback of a low modulus of elasticity of this material.

Finally, there remains the unsolved problem of dissipating the heat generated during operation of the machine.

SUMMARY OF THE INVENTION

The present invention aims to solve as a whole the problems and the drawbacks mentioned above and to provide principally a machine tool sleeve which combines a high rigidity and relatively low weight with an adequate vibration damping capacity—so as to ensure machining to a high degree of precision—and satisfactory dissipate the heat produced during operation of the machine.

Obviously, the objects of the present invention include those of obtaining the abovementioned result in an advantageous manner compatible with manufacture and use on an industrial level.

These and other objects of the present invention are achieved with a spindle support structure or sleeve, of the type comprising a tubular body which is able to be associated with a carriage and on which a spindle is mounted, characterized in that said tubular body comprises a casing, which is made of rigid material, preferably sheet steel, and which has, combined inside it, a layer of agglomerate formed by means of hardening of a mixture consisting of a granulate of stone and/or ceramic and/or expanded clay material and also by a resin of the hardening type, the said layer of agglomerate forming a cavity housing said spindle.

In the practical embodiment of the present invention it is also possible to envisage enclosing the aforementioned layer of agglomerate between the abovementioned sheet steel casing and an inner casing made of a lighter sheet steel or plastic material which may be pre-moulded.

As will emerge from the detailed description which follows of a preferred embodiment of the present invention, owing to the combination of the outer casing made of material with the desired rigidity, for example steel—said casing being able to be made by means of electric welding—with the layer of agglomerate formed inside it, which combines in particular a high vibration damping capacity with an excellent mechanical strength, it is possible to achieve the main objects of the present invention.

Moreover, if ducts for conveying a cooling fluid are housed or embedded in suitable locations of the layer of agglomerate, it is also possible to perform a controlled dissipation of the unwanted heat generated locally during operation of the machine tool.

BRIEF DESCRIPTION OF THE DRAWINGS

In order to explain better the characteristic features and the advantages of the invention, a non-exclusive embodiment thereof will now be described, with reference to the accompanying drawings in which:

FIG. 1 shows a perspective view of a sleeve according to the invention where, for the sake of greater clarity, some details which are shown in the other figures have been omitted;

FIG. 2 shows a longitudinal section through the sleeve, along the line II—II of FIG. 1;

FIGS. 3 and 4 show two cross-sections through the sleeve, along the lines III—III and IV—IV in FIG. 2, respectively;

FIG. 5 shows a second longitudinal section through the sleeve, along the line V—V of FIG. 4.

DETAILED DESCRIPTION OF THE PREFERRED EMBODIMENTS

With reference first of all to FIG. 1, this shows a preferred type of sleeve according to the invention comprising a first tubular casing 10—referred to here as outer casing—and a second tubular casing 20—referred to here as inner casing—having the same axis and arranged inside the first casing so as to form an interspace 30 which is filled with an agglomerate, as explained below.

The outer casing 10 is made of sheet steel, for example by means of known operations of bending and subsequent electric welding. Shaping of the outer casing is such as to allow, in the manner and using the means known to people skilled in the art, attachment thereof to the spindle-support carriage and sliding of the sleeve with respect to the carriage using the usual methods, so that a more detailed description is not necessary.

A short cylindrical tube 50 is welded onto the bottom end 19 of the outer casing 10 and along the same axis of the latter, the internal surface of said tube being suitably machined so as to receive a spindle on which a removable tool may be mounted. These details of the tube 50 and the parts of the machine tool associated with it are not shown in consideration that they are well-known to people skilled in the art and are also not directly relevant for the purposes of the invention.

Also the inner casing 20 is preferably made of sheet steel, which may be thinner than that used for the outer body 10, and has a polygonal or also circular cross-section and is in any case made so as to form an interspace 30 with the outer casing 10. In the embodiment shown in the drawings, the inner casing 20 has an octagonal cross-section, while the outer casing 10 has a substantially square cross-section. Preferably, the cross-sectional shape of the inner casing 20 is chosen according to the internal cross-sectional shape of the outer casing 10 so that the interspace 30 is defined by mutually parallel walls of the two casings 10 and 20.

As already mentioned above, since the inner casing 20 does not have essentially structural functions, it can also be made of a moulded plastic material.

Along at least two opposite sides 21a and 21b of the inner casing 20 there are provided, at regular intervals, a certain number of circular holes 22 with a diameter $D_1$, having the function of receiving cables and/or pipes (not shown) associated with the working components (also not shown) of the spindle and of other parts of the machine tool. Each of the holes 22 is surrounded by a ring 23, having a diameter $D_2$ greater than $D_1$—see FIG. 5. The rings 23, which have a height H equal to the thickness of the interspace 30, are made of steel and butt-welded onto the external surface of the inner casing 20 and onto the internal surface of the outer casing 10 so as to perform the function of spacing elements which connect together the two tubular casings. From the cross-sectional view shown in FIG. 3 it can be easily seen how, in the present embodiment, the rings 23 are arranged on four of the eight sides forming the cross-section of the inner casing 20, so that these rings are in contact with all four walls of the outer casing 10.

One of the walls, such as the wall 24 of the inner casing 20 and the corresponding wall of the outer casing 10, is provided with a pair of wide openings 25 and 26 having the function of allowing access inside the sleeve for operations involving assembly and/or maintenance of the machine components housed inside it.

It should be noted that the holes 22 may consist of a number smaller than that of the rings 23 and their layout depends on the functional requirements for which they are intended.

The same is applicable to the openings 25 and 26, which may consist of a greater number and be located on other walls of the two casings 10 and 20.

Finally, as regards the heat dissipation, this requirement is satisfied by arranging, inside the interspace 30, pipes such as those indicated by the reference numbers 32 and 34 in FIG. 4, said pipes being positioned in the interspace 30 before the latter is filled with the mixture of granulate and resin so that, after hardening of the resin, the pipes remain embedded and therefore fixed within the thickness of the agglomerate.

It is obvious that in these conditions the pipes 32 and 34, which are preferably made of a metallic material with a good thermal conductivity, may be arranged with the desired optimum layout for efficient heat exchange (i.e. for cooling) of specific portions of the sleeve, such as for example the portions of outer casing 10 adjacent to the spindle-support carriage, in the proximity of the guides for sliding of the sleeve on the carriage.

In order to favour gripping of the agglomerate to the adjacent metal surfaces of the two—outer and inner—casings 10 and 20, the internal surface of the outer casing 10 and/or the external surface of the inner casing 20 may be roughened, for example by means of sandblasting the sheet steel from which they are made.

Alternatively, it is possible to envisage small ribs, which may be both parallel and perpendicular to the axis of the sleeve, said ribs improving in addition the rigidity of the sleeve.

According to the invention, the method for manufacturing the sleeve envisages, after the insertion of tubular casing 20 inside the tubular casing 10 and the positioning, inside the interspace 30, of the pipes 32 and 34 intended to form the cooling circuit, casting of a mixture inside the interspace 30, said mixture, once hardened, forming a layer of agglomerate 40 which is contact with the two casings 10 and 20.

The mixture used has notable similarities with the agglomerate material or "composite stone material" made using the product manufacturing technology which is known by the name of "Bretonstone System" and forms the subject of numerous patents relating to the major improvements studied and developed during the last twenty years or more, commencing with Italian patents No. 1,056,388, 1,117,346 and 1,204,276.

In the case of the present invention, the mixture is substantially composed of a granulate consisting of at least one stone material, such as marble, granite, porphyry, etc. and/or a ceramic material, together with at least one hardening resin, in particular an epoxy or polyester resin. In addition to, or as an alternative to, the granulate it is also possible to use other materials, such as expanded clay, which combine a good vibration damping capacity with a relatively low weight.

For the purposes of the present invention it is preferred to use a mixture in which the quantity of resin is as small as possible (without affecting bonding together of the granules of stone material) in order to form an agglomerate in the interspace 30 with a coefficient of linear thermal expansion which is as close as possible to that of the steel from which the casings 10 and 20 are made.

In order to obtain a truly single piece sleeve, it is necessary that the mixture, after being cast inside the interspace 30, undergoes a compaction step by means of application of a vibratory movement to the agglomerate or to the whole structure containing the said agglomerate, followed by hardening as a result of cross-linking of the resin.

The objects which have been indicated above are achieved in view of the following features of the present invention:

(a) the rigidity of the structure is ensured by its high moment of inertia which in turn depends on the high modulus of elasticity of the steel used to manufacture the tubular bodies 10 and 20 and on the notable thickness of the agglomerate which fills the interspace 30;

(b) the overall weight of the structure is relatively low since, compared to a specific weight of about 7.8 kg/dm$^3$ of the steel, the agglomerate has a specific weight typically in the region of 2.4 kg/dm$^3$;

(c) the transmission of the vibrations to the workpiece during machining thereof is minimal, if not non-existent, since the composite structure thus formed has a vibration damping factor which, by way of order of magnitude, is about 10 times that which can be obtained with a structure made exclusively of welded sheet steel;

(d) it is possible to ensure optimum dissipation of the localised heat which is generated inside the spindle during operation of the machine tool.

Although the description provided here refers to a preferred embodiment it is understood that other forms and variants of the present invention are also possible within the scope of the claims below.

In particular, in the case where the sleeve has small dimensions and/or is subject to reduced stresses, the inner tubular body 20 may be dispensed with, even though, during casting and hardening of the agglomerate, it will be required to use a removable formwork made using at least superficially anti-adhesive materials—for example polyethylene—so as to impart to the agglomerate, which in this case comes into contact with only the outer casing 10, the desired geometrical and dimensional characteristics.

In this embodiment, elements which are equivalent to the rings 23 may be provided, securing them in this case to the internal surface of the outer tubular casing.

It is understood moreover that, even though the above description and drawings describe and illustrate a constructional solution in which the agglomerate 40 fills entirely the interspace 30 formed between the inner and outer casings 10 and 20, it is possible to envisage that the layer of agglomerate 40 is only partial, so as to ensure satisfactory damping of the vibrations and at the same time reduce further the dimensions and weight of the sleeve as well as facilitate positioning of the cooling pipes.

The invention claimed is:

1. A support structure or sleeve, for the use in a machine tool, of the type comprising a tubular body which is able to be associated with a carriage and on which a spindle is mounted, comprising:
   a first casing (10) having an axis, which is made of rigid material;
   a second tubular casing having the same axis and housed inside the first casing; and
   an interspace (30) defined by said first and second casings, the interspace being filled at least partially by a vibro-compacted agglomerate (40) formed by means of hardening of a mixture consisting of a granulate of stone or ceramic or expanded clay material, or combination thereof, and a resin of the hardening type so that the resultant structure consists of a single piece forming a cavity housing said spindle.

2. Support structure according to claim 1, further comprising, inside said interspace (30), means for connecting together the internal surface of the first casing (10) and the external surface of the second casing (20).

3. Support structure according to claim 2, wherein said connection means consist of ring elements (23) which are rigidly fixed to the said internal surface of the first casing (10) and the said external surface of the second casing (20), said ring elements (23) having a height (H) which is equal to the thickness of said interspace (30).

4. Support structure according to claim 3, wherein each of said ring elements (23) surrounds a coaxial hole (22) having a diameter ($D_1$) not greater than its own diameter ($D_2$), said holes (22) being provided at least in the second casing (20).

5. Support structure according to claim 1, wherein the internal surface of the said first casing (10) and/or the external surface of the said second casing (20) are roughened in order to favor fixing of the agglomerate.

6. Support structure according to claim 5, wherein the roughening of the internal surface of the said first casing (10) and/or the external surface of the said second casing (20) is achieved by sandblasting.

7. Support structure according to claim 1, wherein the internal surface of the said first casing (10) and/or the external surface of the said second casing (20) are provided with means for favoring the gripping of the agglomerate.

8. Support structure according to claim 1, wherein said first casing (10) is made of sheet steel.

9. Support structure according to claim 1, wherein said second casing (20) is made of sheet steel.

10. Support structure according to claim 9, wherein said first casing (10) is made of sheet steel, and wherein the sheet steel from which the said second casing (20) is made is thinner than the sheet steel from which the said first casing (10) is made.

11. Support structure according to claim 1, wherein said second casing (20) is made of molded plastic material.

12. Support structure according to claim 1, further comprising pipes (32, 34) for circulation of a cooling fluid embedded in the said agglomerate (40).

* * * * *

UNITED STATES PATENT AND TRADEMARK OFFICE
CERTIFICATE OF CORRECTION

| | |
|---|---|
| PATENT NO. | : 7,223,055 B2 |
| APPLICATION NO. | : 10/727933 |
| DATED | : May 29, 2007 |
| INVENTOR(S) | : Luca Toncelli |

It is certified that error appears in the above-identified patent and that said Letters Patent is hereby corrected as shown below:

The following is added to the front page of the patent in the left column:

--(30)    Foreign Application Priority Data

April 22, 2002 (IT).............TV2002A000049 --

Signed and Sealed this

Thirtieth Day of October, 2007

JON W. DUDAS
*Director of the United States Patent and Trademark Office*